Jan. 27, 1925. 1,524,209
E. PISTORIUS
RUBBER TIRE
Filed April 14, 1924

Patented Jan. 27, 1925.

1,524,209

UNITED STATES PATENT OFFICE.

EDMUND PISTORIUS, OF ANNABERG, GERMANY.

RUBBER TIRE.

Application filed April 14, 1924. Serial No. 706,478.

*To all whom it may concern:*

Be it known that I, EDMUND PISTORIUS, a citizen of the German Republic, residing at Annaberg, Germany, have invented certain new and useful Improvements in Rubber Tires, of which the following is a specification.

A rubber tire without air tube must fulfil the condition that it works as much as possible in a similar manner as a pneumatic tire. The rubber tires of known type are either solid tires or consist of two hollow tires but are of insufficient resiliency.

This invention relates to a tire without air tube which as regards resiliency is perfect, possesses all the advantages of a pneumatic tire without such inconveniences as easy damaging, insecurity of keeping the air and others.

An embodiment of the invention is shown, by way of example, on the accompanying drawing, in which:—

The improved tire consists of a cover and of an inner structure made from good Para rubber.

The cover $a$ is closed and has a lining $b$ on its inner surface of its outer portion and an outer lining $c$ on the outer surface of its inner portion. The linings $b$, $c$ are made from canvas impregnated with Para rubber. The flanges $d$ of the cover $a$ are very thick so that in connection with a specially strong rim the tire is securely clamped so that creeping of the cover on the rim is impossible and also variation of the shape by the load, absolute security in running being thus ensured. In the outer surface of the cover $a$ any of the usual non-skid devices may be arranged.

Figure 1:
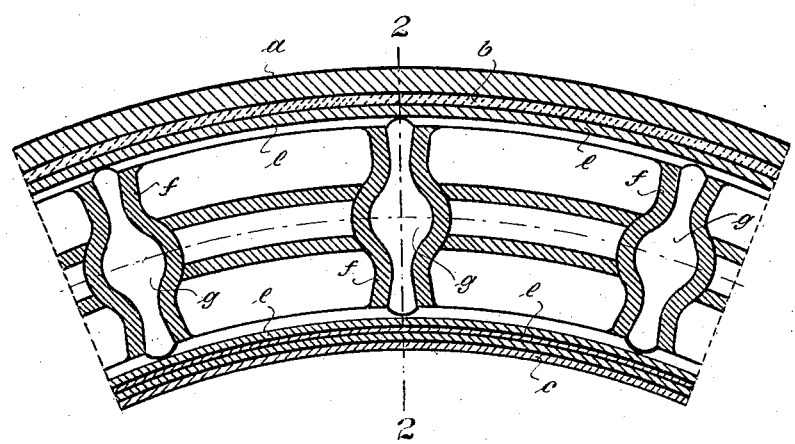
Fig. 1 shows part of a tire in longitudinal section.
Figures 2, 3:
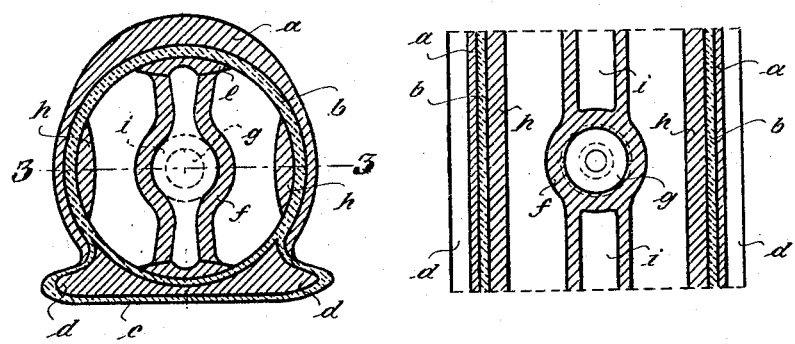
Fig. 2 is a cross section on line 2—2 of Fig. 1.
Fig. 3 is a section on line 3—3 of Fig. 2.

In the cover $a$ sets of ribs, each set consisting of four ribs, are arranged at uniform distances apart, any desired number of such sets being used according to the kind of tire to be produced. The two ribs $e$ of one set (Fig. 2), are arranged in the vertical cross section line of the cover and serve as supports for a rubber tube $f$ enlarged at the middle to form an air bag $g$, this bag forming an independent air chamber. The ribs $h$ of the other set are situated in the line of the horizontal diameter of the cross section and serve as reinforcing beads. The rubber tubes $f$ are connected with one another by short rubber sleeves $i$ each of which forms an independent air chamber. The vertical rubber tubes serve as elastic stays designed to intercept the pressure exerted on the tire and the rubber sleeves $i$ serve for staying the vertical tubes. All elements cooperate to produce a perfect resiliency and the effect is absolutely equal to that of a pneumatic tire and defects of the tire are almost excluded.

I claim:—

1. A rubber tire comprising in combination a closed cover and an inner structure consisting of opposite ribs on the inner surface of the cover and of vertical rubber tubes fixed between the two opposite ribs and enlarged at the middle to form a closed independent air chamber.

2. A rubber tire comprising in combination a closed cover and an inner structure consisting of opposite ribs on the inner surface of the cover, of vertical rubber tubes fixed between the two opposite ribs and enlarged at the middle to form a closed independent air chamber, and of longitudinal rubber sleeves each connecting two vertical rubber tubes and each forming a closed air chamber.

3. A rubber tire comprising in combination a closed cover and an inner structure consisting of opposite ribs on the inner surface of the cover, of vertical rubber tubes fixed between the two opposite ribs and enlarged at the middle to form a closed independent air chamber, of longitudinal rubber sleeves each connecting two vertical rubber tubes and each forming a closed air chamber, and reinforcing ribs on the inner surface of the cover arranged between the pair of ribs for the supporting tubes.

In testimony whereof I affix my signature in presence of two witnesses.

EDMUND PISTORIUS.

Witnesses:
M. CROEBER,
JOHN A. SCOTT.